United States Patent

(12) United States Patent
Srinivasan

(10) Patent No.: US 7,120,218 B2
(45) Date of Patent: Oct. 10, 2006

(54) METHOD FOR CALIBRATING STEAM GENERATOR WATER LEVEL MEASUREMENT

(75) Inventor: Jagannathan Seenu Srinivasan, Murrysville, PA (US)

(73) Assignee: Westinghouse Electric Co, LLC, Pittsburgh, PA (US)

( * ) Notice: Subject to any disclaimer, the term of this patent is extended or adjusted under 35 U.S.C. 154(b) by 256 days.

(21) Appl. No.: 10/647,757

(22) Filed: Aug. 25, 2003

(65) Prior Publication Data
US 2006/0029179 A1 Feb. 9, 2006

Related U.S. Application Data

(60) Provisional application No. 60/413,511, filed on Sep. 25, 2002.

(51) Int. Cl.
*G21C 7/32* (2006.01)
(52) U.S. Cl. ............... 376/211; 376/258; 376/246; 376/260; 122/451.1; 73/299
(58) Field of Classification Search ............ 376/245, 376/258, 260, 211, 246; 73/1, 861, 299; 122/451, 487, 451.1; 60/667; 165/157
See application file for complete search history.

(56) References Cited

U.S. PATENT DOCUMENTS

| | | | |
|---|---|---|---|
| 4,285,396 A * | 8/1981 | Schwoerer et al. ......... 165/162 |
| 4,554,889 A | 11/1985 | Lilly | |
| 4,632,068 A | 12/1986 | Appleman et al. | |
| 4,709,756 A * | 12/1987 | Wilson et al. ............. 165/162 |
| 4,728,481 A | 3/1988 | Geets | |
| 4,856,344 A * | 8/1989 | Hunt ..................... 73/861.04 |
| 5,024,802 A | 6/1991 | Srinivasan | |
| 5,146,783 A * | 9/1992 | Jansche et al. ............. 73/301 |
| 5,249,551 A * | 10/1993 | Kirkpatrick ............... 122/487 |
| 5,365,555 A * | 11/1994 | Sawabe et al. ........... 376/258 |
| 5,559,293 A * | 9/1996 | Kirkpatrick ............... 73/861 |
| 6,654,697 B1 * | 11/2003 | Eryurek et al. ............. 702/47 |

OTHER PUBLICATIONS

Mandl et al., "Water Inventory Determination Using Differential Pressure Cells," v. 110, n 1 12(I), 1988, p. 55-59.*
Mandl et al., "Water Inventory Determination Using Differential Pressure Cells," Nuclear Engineering and Design, 110 (1988), 55-59.*

* cited by examiner

*Primary Examiner*—R Palabrica

(57) ABSTRACT

A method is provided for determining and controlling feed water level in a steam generator of a nuclear power plant, whereby the water level sensor is calibrated in terms of the pressure drop across structural components in the feed water path. The water level differential pressure sensor is calibrated so that maximum water level is indicated as the level corresponding to the upper tap level plus the pressure drop across the foregoing structural components at maximum power plant power.

4 Claims, 5 Drawing Sheets

METHOD FOR CALIBRATING STEAM GENERATOR WATER LEVEL MEASUREMENT

CROSS-REFERENCE TO RELATED APPLICATION

This application claims priority under 35 U.S.C. §119(e) to provisional application Ser. No. 60/413,511, filed Sep. 25, 2002.

BACKGROUND OF THE INVENTION

1. Field of the Invention

This invention relates to a method for determining the feed water measurement in a steam generator such as those used in pressurized water reactors and, more particularly, to a method for using a differential-type transmitter to sense the feed water level in a steam generator in a nuclear power plant.

2. Related Art

A typical nuclear steam generator comprises a vertically-oriented shell; a plurality of U-shaped tubes disposed in the shell so as to form a tube bundle; a tube sheet for supporting the tubes at the ends opposite the U-like curvature; a dividing plate that cooperates with the tube sheet forming a primary fluid inlet header at one end of the tube bundle and a primary fluid outlet header at the other end of the tube bundle; a primary fluid inlet nozzle in fluid communication with the primary fluid inlet header; and a primary fluid outlet nozzle in fluid communication with the primary fluid outlet header. The steam generator also comprises a wrapper disposed between the tube bundle and the shell to form an annular chamber adjacent the shell, and a feed water ring disposed above the U-line curvature end of the tube bundle. The primary fluid, having been heated by circulation through the nuclear reactor core, enters the steam generator through the primary fluid inlet nozzle. From the primary fluid inlet nozzle, the primary fluid is conducted through the primary fluid inlet header, through the U-tube bundle, out the primary fluid outlet header and through the primary fluid outlet nozzle to the cold leg of the reactor coolant loop. At the same time, feed water is introduced to the steam generator through the feed water ring. The feed water is conducted down the annular chamber adjacent the shell until the tube sheet near the bottom of the annular chamber causes the feed water to reverse direction, passing in heat transfer relationship with the outside of the U-tubes and up through the inside of the wrapper. While the feed water is circulating in heat exchange relationship with the tube bundle, heat is transferred from the primary fluid in the tubes to the feed water surrounding the tubes causing a portion of the feed water to be converted to steam. The steam then rises and is circulated through a series array of moisture separators, which dries out the steam before the steam is conveyed to steam turbine and condensation equipment, which are respectfully employed to drive a generator to produce electricity and to return the condensed fluid back to the steam generator feed water inlet.

The current steam generator feed water level measurement system is more fully described in U.S. Pat. No. 5,024,802. The current steam generator feed water level measurement methodology relies on the use of a differential-type transmitter for comparing the steam generator feed water level with a reference leg pressure input. The transmitter responds to a differential of water pressures inputted to it and provides an output representative of the difference between the reference leg pressure and the pressure due to the height of the liquid in the steam generator. This differential is a good correlation to water level when the lower pressure tap, for measuring the water level in the steam generator, is located in a relatively low velocity region of the steam generator, e.g., above the transition section of the steam generator shell. However, if the lower pressure tap is moved to a higher velocity region, e.g., below the transition portion of the shell, an error is introduced due to the effective velocity head of the moving water. In such circumstances, a level measurement penalty must be taken, meaning that the steam generator operating level margin, i.e., a range of permissible water levels, needs to be reduced. However, it is preferable to locate the lower tap in a high velocity region so as to minimize what is known as the shrink/swell phenomenon.

The control of feed water level in the secondary loop of a nuclear steam supply system is exemplary of situations where control is difficult because the system behaves with non-minimum phase dynamics. Non-minimum dynamics is a term used to describe a property of the frequency domain transfer function between plant input function and plant output function. Transport lags or pure-time delay between an input signal and its corresponding output is one form of non-minimum phase behavior. Another form of non-minimum phase behavior is an initial negative response of an output signal before changing sign and approaching its positive asymptote. This type of non-minimum phase behavior is what is often called by operators of such nuclear steam supply systems "shrink/swell behavior".

Changes in reactor power, steam flow, feed water temperature and feed water flow all affect the measured level of secondary loop feed water contained in the steam generator. The feed water level controller's basic task is, therefore, to maintain the secondary side steam generator water level on target and within limits by changing feed water flow to compensate for changes in level produced by the other factors. The main consequence of the long lags and shrink and swell effects is that a controller must anticipate the affects of changes in plant state or control actions on steam generator level, and make compensatory responses before the ultimate affect of the event on steam generator level is manifested in measured level. Accordingly, it is very desirable to minimize the shrink/swell phenomenon by locating the lower pressure tap in a region such that the velocity head will be about 6 in. to 8 in.

U.S. Pat. No. 5,024,802 teaches a method for compensating for the velocity head effects experienced by the lower tap in high velocity regions by adding compensation during calibration so as to reduce the margin added to the high level trip set point to account for uncertainty in water level. This invention recognizes the need to further compensate the differential-type pressure transmitter signal for the pressure-altering effects of the feed water level caused by certain structural restrictions that impact the feed water pressure experienced at the lower tap, such as the middle deck plate pressure delta.

SUMMARY OF THE INVENTION

It is an object of this invention to provide, in a steam generator used in a pressurized water reactor nuclear power system, an improved method of measuring the feed water level in the steam generator taking into account process variations which impact the calibration accuracy of the level measurements. The water level differential pressure sensor is calibrated so as to account for process variations in addition to or instead of velocity head variations, such as middle deck plate delta-pressure variation. These process variations are functions of power and level. If these variations are not compensated for in the water level measurements and are accounted for in the uncertainty calculations, they will be entered as bias terms and will reduce the operating margins, i.e., the range of water levels within which operation is controlled. In accordance with this object, calibration of the differential pressure transmitter includes adding a first bias factor from the differential pressure at maximum water level, the first bias factor being equal to the middle deck plate delta-pressure at 100% power level, or another determined fraction of the maximum middle deck plate delta-pressure, to adjust the transmitter reading at any water level to account for the middle deck plate delta-pressure.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
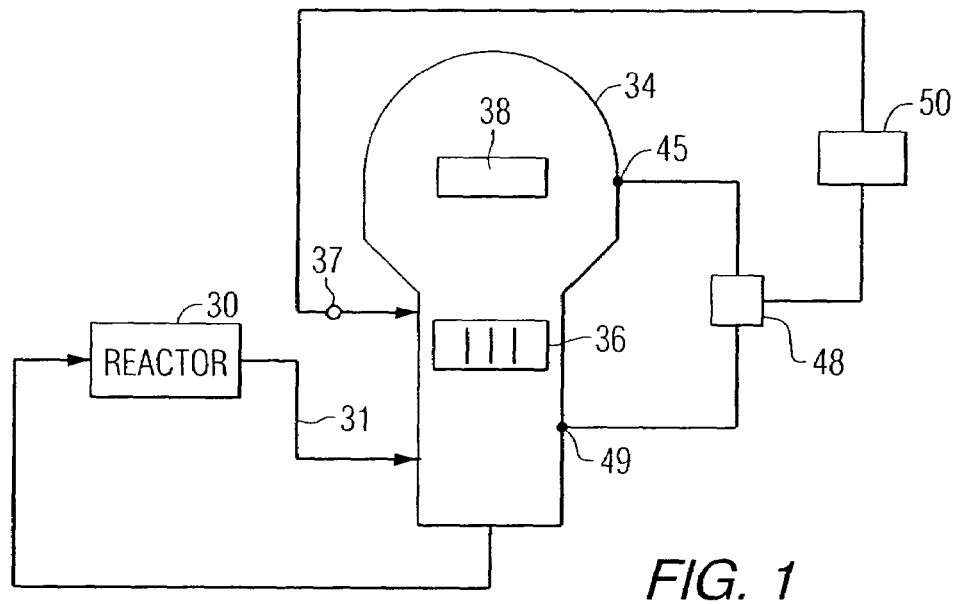
FIG. 1 is an overall block diagram showing the environment of a steam generator for which the method of this invention is used.
Figure 6:
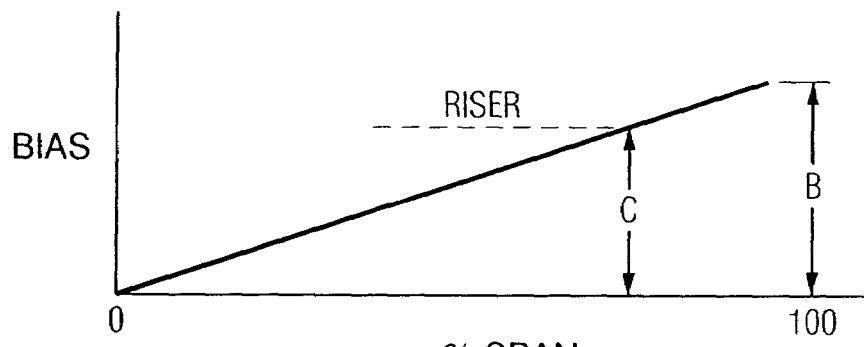
FIG. 6 is a graphical representation of the bias in calibration versus percent level span.

FIG. 1 shows a rudimentary block diagram of a typical pressurized water reactor system. The reactor 30 generates hot water which is coupled through suitable piping 31, commonly referred to as the hot leg of the primary coolant loop, to a steam generator 34. The water coolant from the reactor is circulated through heat transfer tubes illustrated at 36, where it imparts its heat to feed water introduced as shown at 37, and then is returned to the reactor. The rising steam generated from heating the feed water is passed through moisture separation apparatus illustrated at 38. As is well known, there is a minimum level of feed water that must be maintained in the steam generator, to draw heat from the primary loop of the reactor so that the reactor does not overheat. There is also a maximum level of feed water that should be maintained within the steam generator which, if exceeded, would prevent the moisture separators from properly separating moisture from the steam.

Figure 2:
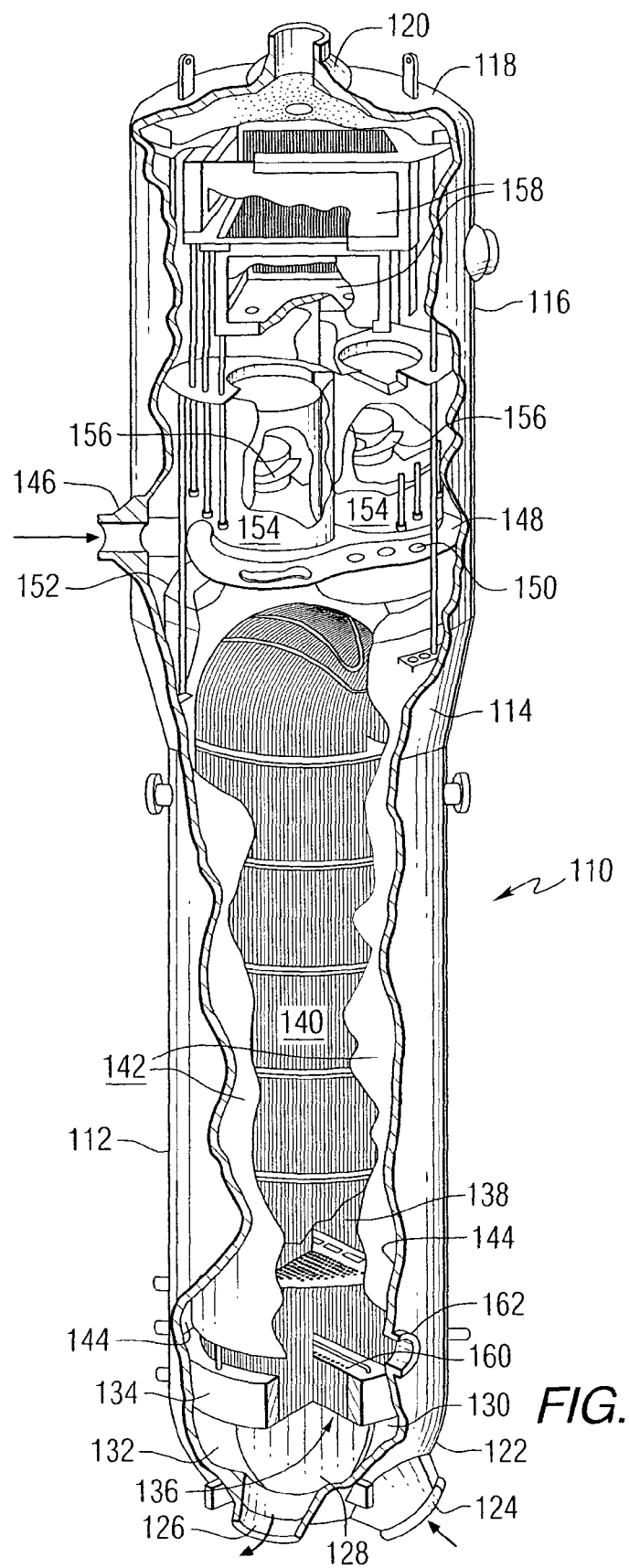
FIG. 2 is a partial cross-sectional view, in elevation, of a typical steam generator.

FIG. 2 shows a more detailed view of the steam generator 34 shown in FIG. 1 and referred to generally by reference character 110 in FIG. 2. The steam generator 110 comprises a lower shell 112 connected to a frustoconical transition shell 114 which connects lower shell 112 to an upper shell 116. A dished head 118 having a steam nozzle 120 disposed thereon encloses upper shell 116 while a substantially semispherical head 122 having inlet nozzle 124 and outlet nozzle 126 disposed thereon encloses lower shell 112. A dividing plate 128 centrally disposed in the semispherical head 122 divides the semispherical head 122 into an inlet compartment 130 and an outlet compartment 132. The inlet compartment 130 is in fluid communication with inlet nozzle 124 while outlet compartment 132 is in fluid communication with outlet nozzle 126. A tube sheet 134 having tube holes 136 therein is attached to the lower shell 112 and the semispherical head 122 so as to isolate the portion of the steam generator 110 above the tube sheet 134 from the portion below the tube sheet 134 in a fluid-tight manner. The tubes 138, which are heat transfer tubes shaped with a U-like curvature, have their ends disposed in tube holes 136. The tubes 138, which may number about 7000, form a tube bundle 140. Dividing plate 128 is attached to the tube sheet 134 so that the inlet compartment 130 is physically separated from the outlet compartment 132. Each tube 138 extends from the tube sheet 134 where one end of each tube 138 is in fluid communication with the inlet compartment 130, up into transition shell 114 where each tube 138 is formed in a U-like configuration, and back down to the tube sheet 134 where the other end of each tube 138 is in fluid communication with the outlet compartment 132. In operation, the reactor coolant having been heated from circulation through the reactor core, enters steam generator 110 through inlet nozzle 124 and flows into inlet compartment 130. From the inlet compartment 130, the reactor coolant flows through tubes 138 in tube sheet 134, up through the U-shaped curvature of tubes 138, down through tubes 138 into outlet compartment 132. From outlet compartment 132, the reactor coolant is circulated through the remainder of the reactor coolant system in a manner well known in the art.

Tube bundle 140 is encircled by a wrapper 42 which extends from near the tube sheet 134 into the region of the transition shell 114. The wrapper 142 together with the lower shell 112 form an annular chamber 144. A secondary fluid or feed water inlet nozzle 146 is disposed on upper shell 116 above the tube bundle 140. A feed water header 148 comprises three loops forming a generally cloverleaf shaped ring, is attached to feed water inlet nozzle 146. Feed water header 148 has therein a plurality of discharge ports 150 arranged in varying arrays so that a greater number of discharge ports 150 are directed toward annular chamber 144, then are directed otherwise.

During operation, feed water enters steam generator 110 through feed water inlet 146, flows through feed water header 148 and out of feed water header 148 through discharge ports 150. The greater portion of the feed water exiting discharge ports 150 flows down annular chamber 144 until the feed water contacts tube sheet 134. Once reaching the bottom of annular chamber 144, near tube sheet 134, the feed water is directed inward around tubes 138 of tube bundle 140 where the feed water passes in heat transfer relationship with the tubes 138. The hot reactor coolant within the tubes 138 transfers heat through the tubes 138 to the feed water, thereby heating the feed water. The heated feed water then rises by natural circulation up through the tube bundle 140. In its travel around the tube bundle 140, the feed water continues to be heated until steam is produced in a manner well known in the art.

The wrapper 142 has an upper cover or wrapper head 152 disposed thereon above the tube bundle 140. The wrapper head 152 is sometimes referred to as the middle deck plate. Disposed on the middle deck plate 152 are sleeves or risers 154, which are in fluid communication with the steam produced near the tube bundle 140 and have centrifugal swirl vanes 156 disposed therein. Disposed above the sleeves 154 is a moisture separator 158, which may be a chevron moisture separator. The steam that is produced near the tube bundle 140 rises through the sleeves 154, where centrifugal swirl vanes 156 cause some of the moisture in the steam to be removed. From the sleeves 154, the steam continues to rise through moisture separator 158 where more moisture is removed. Eventually, the steam rises through steam nozzle 120 from where it is conducted through usual machinery to produce electricity all in a manner well known in the art.

Figure 3:
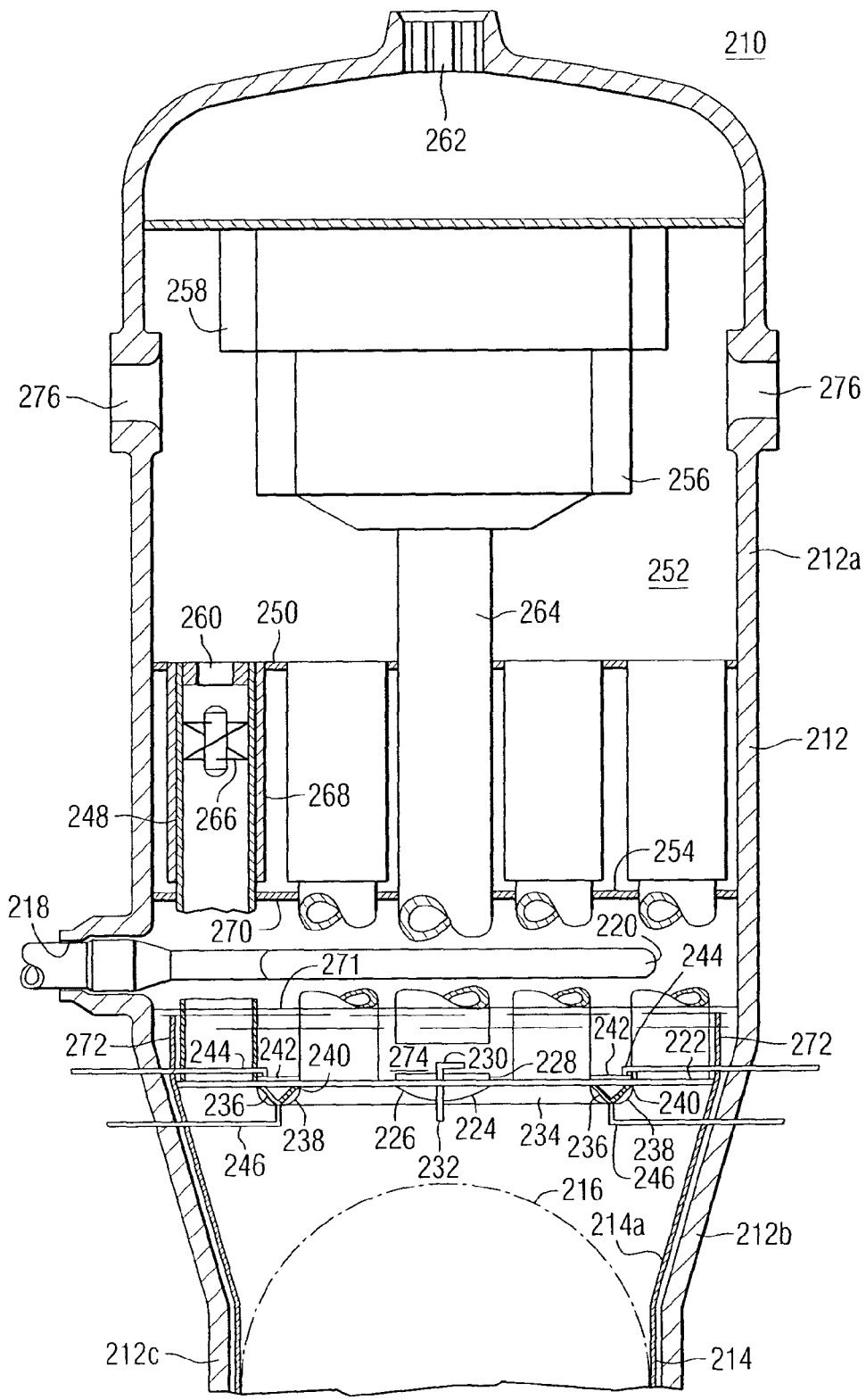
FIG. 3 is a partial cross-sectional view, in elevation, of the upper portion of the steam generator of FIG. 2.

As can be appreciated from FIG. 3, which is a partial cross-sectional view in elevation, of the upper portion of the steam generator of FIG. 2, steam generated within the wrapper or tube bundle enclosure 214, which corresponds to the wrapper 142 shown in FIG. 2, along with entrained water, flows upwardly through a plurality of primary vapor separators or risers 248 extending vertically from a lower deck plate 222, which serves as the wrapper cover 152 noted in FIG. 2, and in vapor flow communication with the wrapper interior. The upper ends of the separators 248 pass through and are supported by an upper plate member, or mid-deck plate 250 and discharge the steam into the upper chamber 252 in the shell 212. The separators 248 are further supported by an intermediate horizontal plate or intermediate deck plate 254.

A pair of vertically-stacked chevron moisture separators 256 and 258 are supported within the chamber 252 in a series flow relationship with the primary vapor separator outlet nozzles 260, such that the steam within chamber 252 must pass through the separators prior to being discharged from the generator through the outlet port 262, which corresponds to the steam nozzle 120 shown in FIG. 2. The entrained water, which is separated from the vapor by the chevron separators 256 and 258, is collected and drains through a central vertical drain pipe 264, which extends to a point near the lower deck plate 222.

Vapor separating swirl vanes 266 are disposed within each primary vapor separator 248 adjacent to the discharge nozzle and orifice 260 to initially separate the entrained water from the vapor passing therethrough. Due to the contour of the swirl vanes, the mixture velocity and mixture density differences, the separated water is centrifuged in an outward fashion toward the primary separator enclosures where it flows through annular water downcomers 268, which discharge the water onto the upper surface of the intermediate support or deck plate 254. This intermediate support plate has a plurality of openings 70 for gravity draining of the separated water.

Thus, it can be seen that all water condensed or separated from the vapor discharged from the wrapper 214 is eventually collected and directed back to the lower deck plate 222. The transition portion 212B and lower portion 212C of the shell 212 form an upwardly open chamber which receives the recirculating water and feed water mixture, which forms a pool having a top level 271, as shown in FIG. 3.

Figure 4:
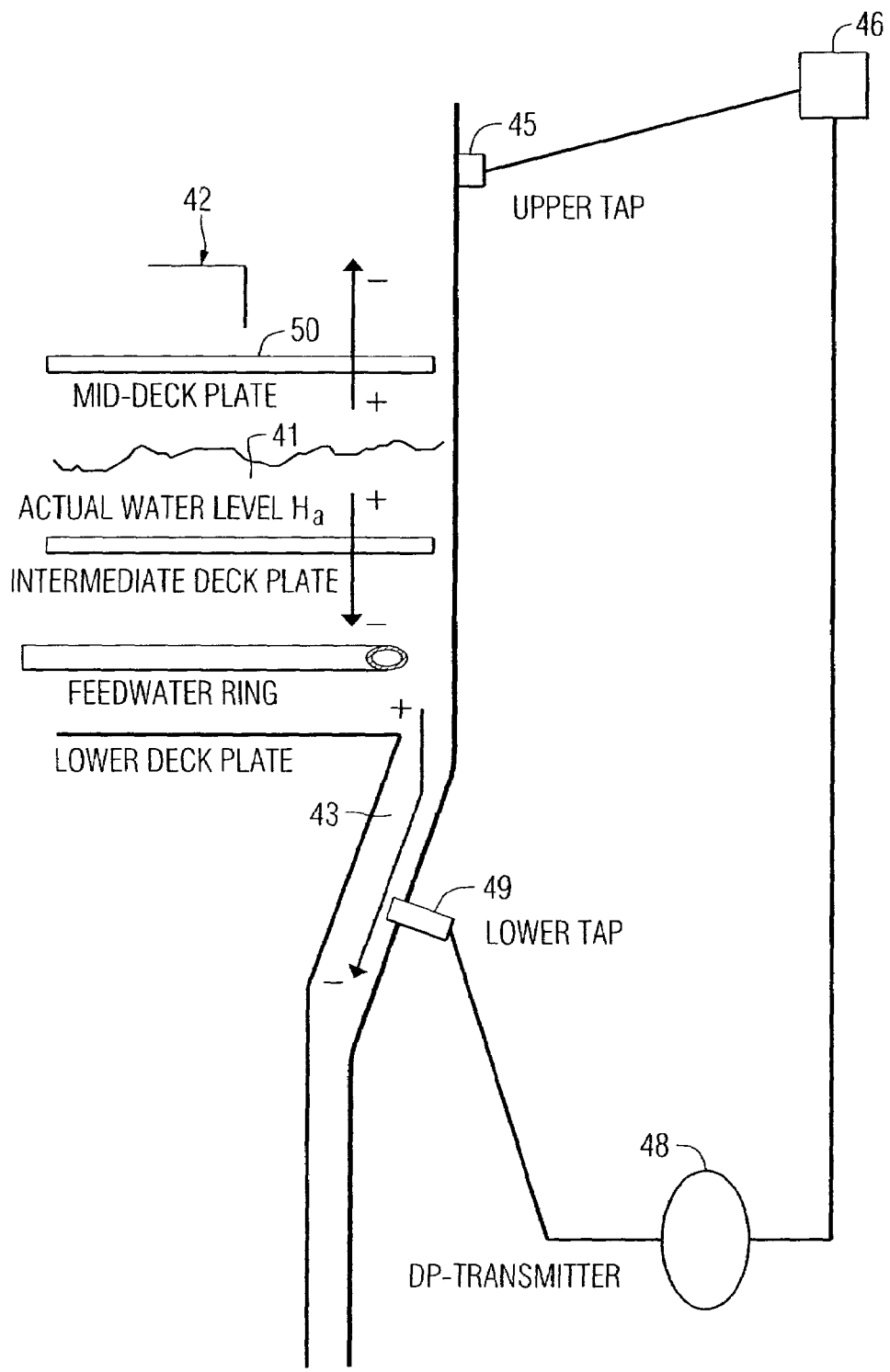
FIG. 4 is a schematic representation indicating measurements taken in carrying out the method of this invention.

Referring now to FIG. 4, there is shown a schematic diagram illustrating the measurements taken in practicing the method of this invention. A steam generator is illustrated at 34 and the nominal water level is illustrated at 41. The top of the riser, through which the steam comes, is illustrated at 42. The operating premise is that the water level should not rise above the top of the riser. The annular channel between the shell and the wrapper, through which recirculated water is passed, is illustrated at 43. The upper tap for the differential pressure sensor employed to measure feed water level is illustrated at 45; steam is condensed in condensate pot 46, which fills the reference leg between 46 and 48. This provides a reference pressure, which is inputted to a first input of a differential pressure transmitter 48, e.g., about 262 in. (6.655 meters) of water at 80° F. (26.67° C.). Thus, the first input to the differential transmitter 48 is a pressure representing a reference leg. The lower tap 49 provides a second water pressure signal which is inputted to the differential pressure transmitter 48, the transmitter generating a signal which is representative of the difference of the steam generator water level and the reference leg. The lower tap 49 is located in the high velocity region for the reasons mentioned above. Thus, when the feed water is at its maximum level, the transmitter output is at its minimum; when the feed water is at its lowest level, the transmitter output is at its maximum. In practice, the output of transmitter 48 is connected to a feed water controller 50, which controls the steam generator water level by controlling feed water input at 37.

In accordance with the original method of operation, the differential pressure seen by the transmitter 48 is calibrated to be the difference between the reference leg pressure and the pressure due to the column of water or process liquid at the 100% level, i.e., at the upper tap. The method described in U.S. Pat. No. 5,024,802 proposed a correction factor to the static pressure measurement at 100% level, to account for the velocity head generated at the lower tap. This invention further reduces the operating margin penalty imposed to compensate for other process variations, such as the middle deck plate, 50, delta-pressure, that are functions of power and feed water level. The middle deck plate delta-pressure variation, i.e., the pressure drop across the middle deck plate introduces a positive error, i.e., the indicated feed water level is higher than the actual level. Part or all of the middle deck plate error can be accounted for during calibration and hence, reduce the uncertainties used in the analysis to determine reactor trips/safeguards actuation setpoints.

Originally, the differential pressure transmitter in the feed water level measurement system was calibrated at minimum and maximum water levels, assuming static conditions. Thus, for a minimum water level corresponding to the lower tap 49, the pressure differential is greatest, and the differential pressure transmitter is calibrated to its maximum output. For example, for a span between the lower and upper taps of 262 in. (6.655 meters), the differential pressure calculates to 220 in. (5.588 meters), corresponding to a differential pressure transmitter output of 20 milliamps. For 100% water level, where the differential pressure transmitter output should be minimum, calibration is performed by inputting a calculated differential pressure corresponding to the 100% level and adjusting the meter to provide a minimum output. Thus, calibration is made without any consideration of the effect of the velocity head or the pressure drop experienced across some of the structural elements in the feed water flow path, e.g., the middle deck plate. For example, a water level at the upper tap results in a calculated 60 in. (1.524 meters) differential pressure and a differential pressure transmitter reading of 4 milliamps.

Figure 5:
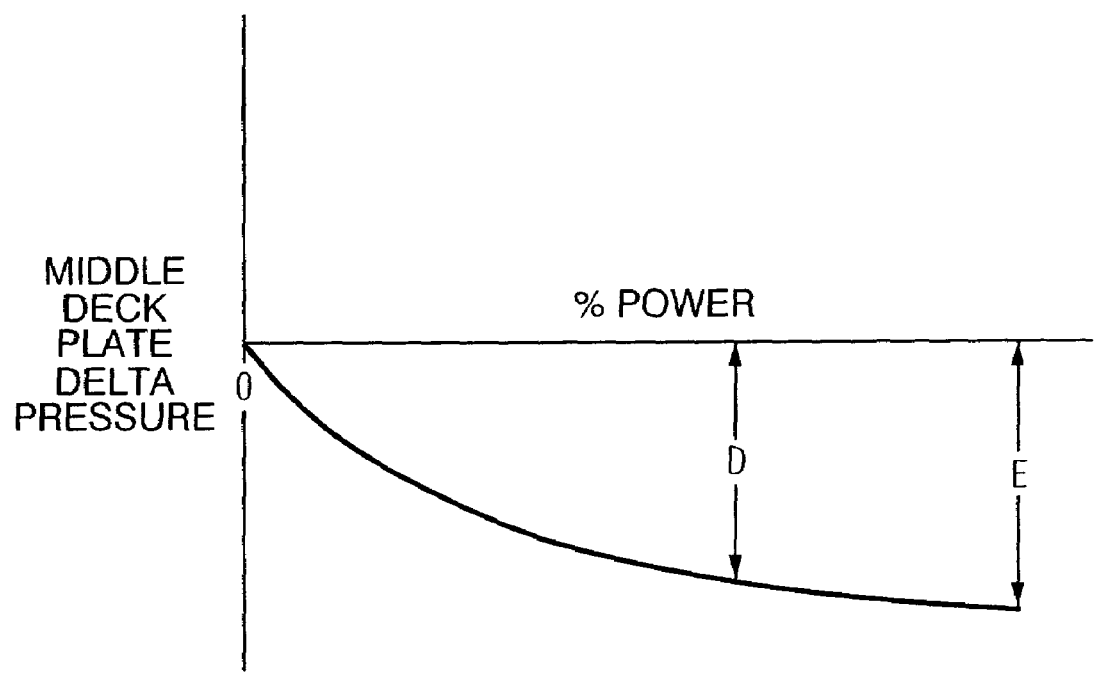
FIG. 5 is a graphical representation of the middle deck plate delta-pressure variation versus percent power.

The pressure drop across the middle deck plate is a function of steam flow and the maximum occurs at 100% steam flow, as shown in FIG. 5.

Figure 7:
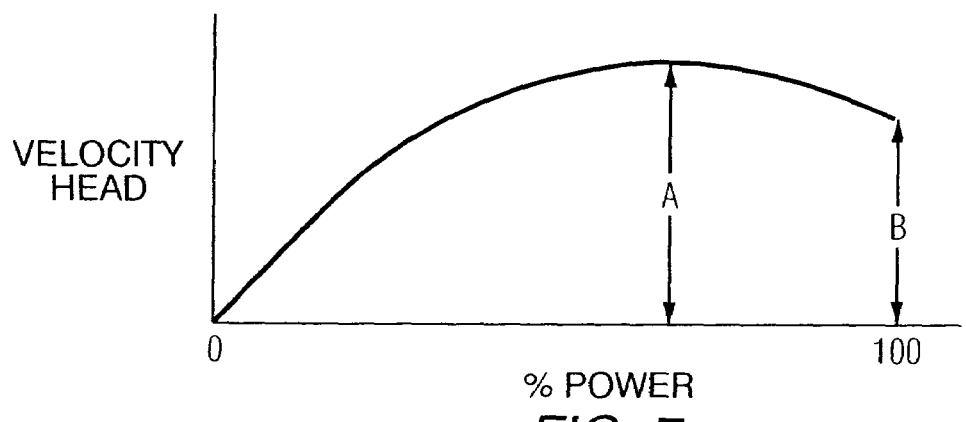
FIG. 7 is a graphical representation of velocity head v. percent power.

The maximum velocity occurs between 50–60% power as seen in FIG. 7. The maximum velocity head error is defined as the penalty due to the velocity head.

The maximum pressure drop across the middle deck plate occurs at 100% power as seen in FIG. 5. The maximum deck plate delta-pressure variation is defined as a penalty due to the pressure drop across the middle deck plate. Unlike the velocity head penalty, the middle deck plate pressure drop introduces a positive error, indicating a feed water level higher than the actual level.

In the invention of this application, calibration is adjusted by introducing a bias at the 100% feed water level indication. A negative bias to account for the penalty due to the velocity head, if appropriate, and a positive bias for the penalty due to the pressure drop across the middle deck plate. A bias correction for the velocity head may not always be appropriate, for example, where the lower tap is placed in a stagnant region of the feed water pool, e.g., above the shell transition 12B shown in FIG. 3. Additionally, while the middle deck plate pressure drop is used as an example in the preferred embodiment, it should be appreciated that the invention covers the pressure drop across any of the structural elements in the feed water path between the upper and lower taps such as intermediate deck plate, feed ring, etc. Thus for maximum water level, corresponding to the minimum differential pressure transmitter output, the differential pressure is in part the difference between the reference leg pressure and the pressure due to the column of the process liquid further adjusted in the negative direction by a bias "B" illustrated at FIG. 7 and further adjusted by a bias "E" in the positive direction as illustrated in FIG. 5. Bias "B–E" may be selected as the velocity head at 100% power level minus mid-deck plate delta-pressure at 100% power, or alternatively, may be any other fraction of the difference.

In addition, for maximum water level, corresponding to the minimum differential transmitter output, the differential pressure is the difference between the reference leg pressure and the pressure due to the column of the process liquid adjusted by a bias "B" as described above, further adjusted by a bias "E" illustrated at FIG. 5. Bias "E" may be selected as the pressure drop across the middle deck plate at 100% power level, or alternately, may be any other fraction of the maximum middle deck plate delta-pressure. The bias to compensate for the middle deck plate pressure drop should be taken at the same power level as that of the velocity head bias is calculated at if the velocity head correction factor is appropriate. The middle deck plate pressure drop "E" is determined by the vendor. Thus in the practice of this invention, the maximum water level calibration is performed by calculating the pressure due to the water and subtracting from that calculation, a bias "B" calculated as set forth above (if the velocity head is a factor) and adding a bias "E" calculated as set forth immediately above. The calculated equivalent differential water pressure is inputted to the differential transmitter, and the transmitter is calibrated to its minimum value. By way of example, for a "B" value of 30 in. (0.762 meters) and for a "E" of 10 in. (0.254 meters), the net calculated differential pressure at full water level is calculated to be 80 in. (2.032 meters) (30−10+60, where 60 in. (1.524 meters) is the pressure difference due to the reference leg and steam generator (process) side pressure difference), which would correspond to a minimum transmitter reading of 4 milliamperes. The low water level differential pressure would again typically be 220 in. (5.588 meters) of water corresponding to a maximum or full meter reading of 20 milliamperes.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. In a nuclear power plant, a method of controlling a steam generator feed water level, wherein a steam generator has an upper level tap corresponding to an upper level, a lower level tap corresponding to a lower level, the upper level tap and the lower level tap having a span there between, a maximum permissible feed water level positioned between said lower level and upper level taps, a structural component between the upper level tap and the lower level tap within the steam generator, and level sensor means for indicating water level between a first range limit and a second range limit, said sensor means being connected to at least said lower level tap comprising:

providing a measure of a delta-pressure variation at about the lower level tap attributable to the structural component;

calculating a measure of full feed water level as the upper level plus said measure of the delta-pressure variation;

calibrating said level sensor means to provide an output at said first limit corresponding to an input thereto representative of said measure of full feed water level; and controlling said feed water level when said sensor means indicates that said high level setpoint has been reached.

2. The method of claim 1 wherein said sensor means senses differential pressure and has inputs connected to said lower and upper taps, respectively, and comprising calculating the differential pressure for water level at said lower tap and calibrating said level sensor means to provide an output at said second range limit corresponding to water level at said lower tap.

3. The method of claim 2 wherein said measure of the delta-pressure variation attributable to the structural component is the pressure variation experienced at maximum power of the nuclear power plant.

4. The method of claim 1 further comprising the steps of:

calculating a measure of velocity head at or about the lower level tap; and calculating the measure of full feed water level as the upper level plus said measure of the delta-pressure variation, less the measure of velocity head.

* * * * *